United States Patent [19]

Hodges

[11] Patent Number: 5,066,114
[45] Date of Patent: Nov. 19, 1991

[54] HIGH REFRACTION INDEX ENVELOPING MEDIUM LENS SYSTEM

[76] Inventor: Marvin P. Hodges, 1565 Shadowglen Ct., Westlake Village, Calif. 91361

[21] Appl. No.: 514,606
[22] Filed: Apr. 26, 1990
[51] Int. Cl.$^5$ ............................ G02B 1/06; G02B 3/12
[52] U.S. Cl. ................................................... 359/665
[58] Field of Search ................................ 350/418, 419

[56] References Cited
U.S. PATENT DOCUMENTS
3,976,364 8/1976 Lindemann et al. ................. 350/418

Primary Examiner—Bruce Y. Arnold
Assistant Examiner—Rebecca D. Gass
Attorney, Agent, or Firm—Mason, Kolehmainen, Rathburn & Wyss

[57] ABSTRACT

A lens system that utilize a high refractive index enveloping medium in which one or more lens elements of low refractive index material are interspersed within the fluid is disclosed. Preferably, the enveloping medium is a liquid optical fluid contained in a hollow shell. Hollow air-filled chambers, fabricated from a material similar in refractive index as that of the fluid, are supported in the liquid and serve as low index refractive elements in the higher index enveloping medium.

22 Claims, 2 Drawing Sheets

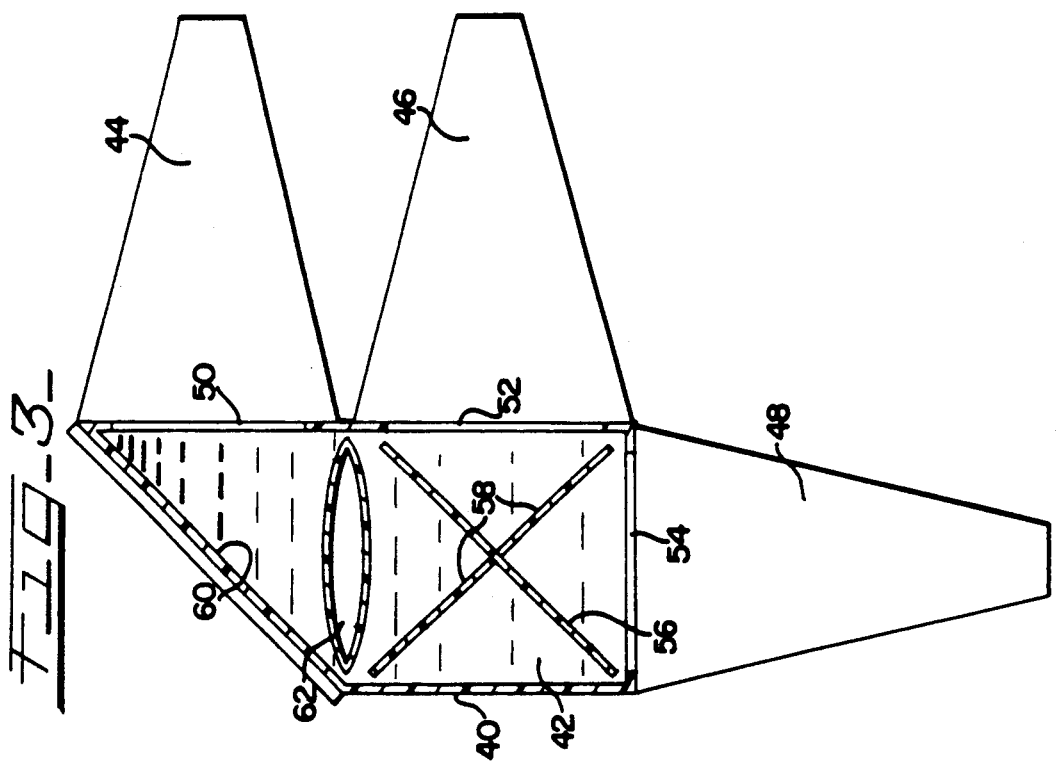
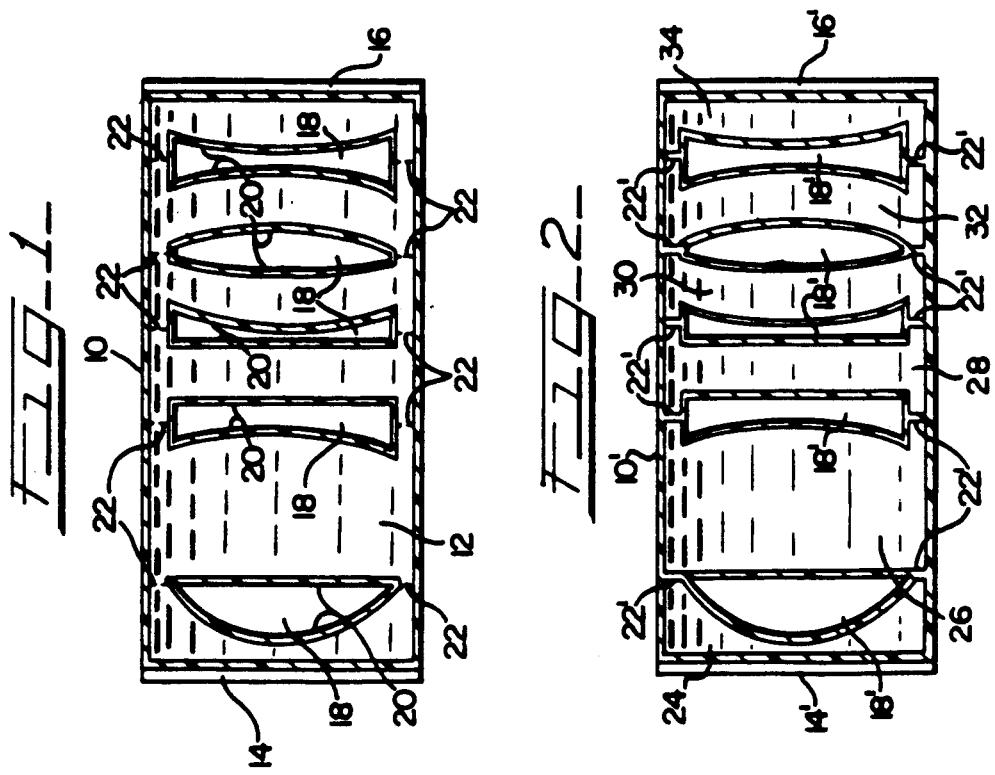

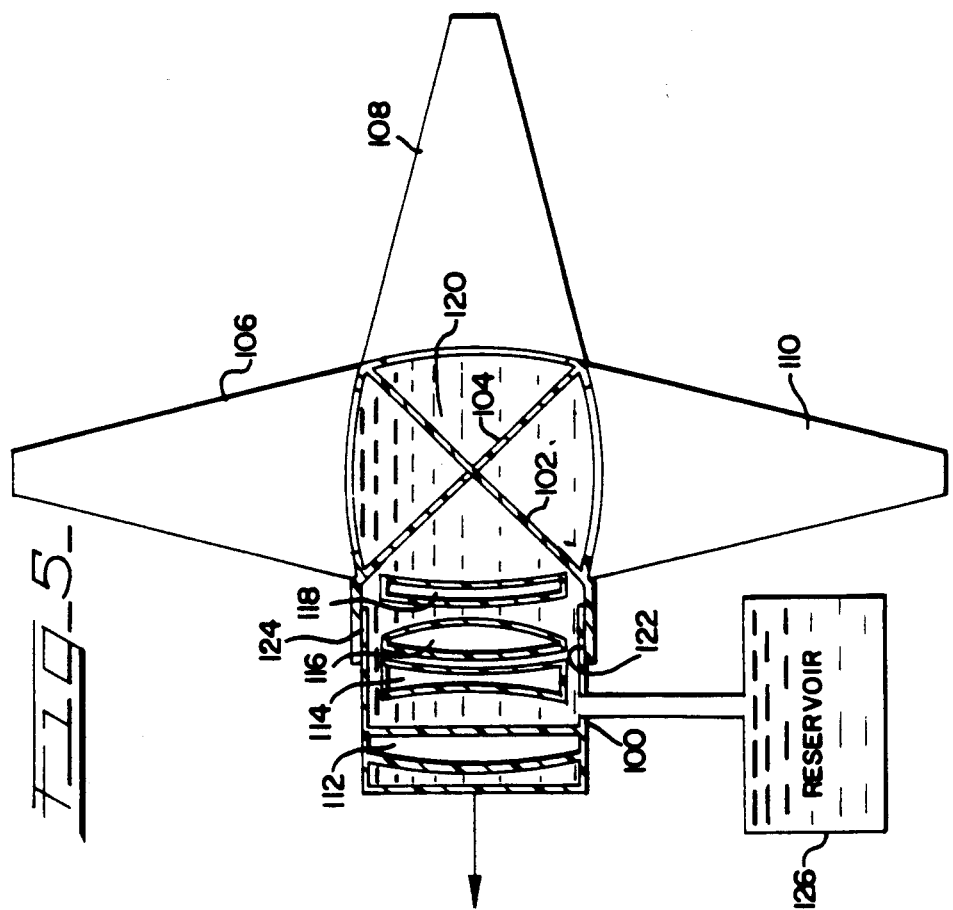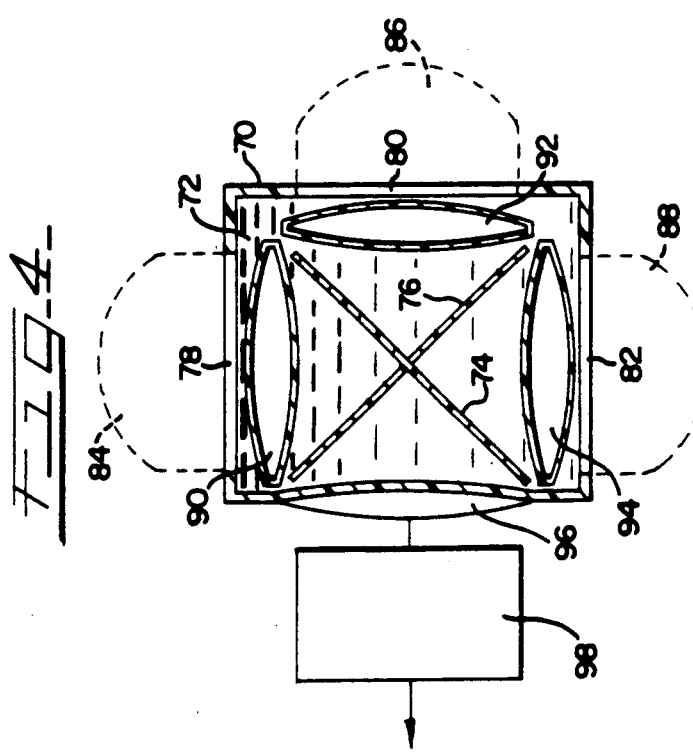

HIGH REFRACTION INDEX ENVELOPING MEDIUM LENS SYSTEM

BACKGROUND OF THE INVENTION

1. Field of the Invention

This invention relates generally to lens systems and, more particularly, to a lens system utilizing one or more low refractive index lens elements contained within a higher refractive index enveloping medium.

2. Description of the Prior Art

Various lens systems are known. Such lens systems generally employ one or more refractive elements formed from a material having a relatively high index of refraction, such as plastic or glass, contained in a medium, such as air, having a relatively low index of refraction. While such systems are satisfactory for many applications, the many air-to-glass interfaces introduce various losses. In addition, conventional lens systems that use air as the enveloping medium are not entirely suitable for certain high temperature applications, such as those encountered in projection systems that utilize one or more high intensity cathode ray tubes or liquid crystal displays that should be cooled.

SUMMARY

Accordingly, it is an object of the present invention to provide a lens system that overcomes many of the disadvantages of the prior art systems.

It is another object of the present invention to provide a lens system that utilizes one or more lenses of a relatively low refractive index surrounded by a medium having a higher refractive index.

It is another object of the invention to more economically manufacture aspheric and Fresnel refractive elements for improved resolution and speed.

It is another object of the present invention to provide a lens system having good thermal properties.

It is another object of the present invention to provide an optical system in the form of a liquid-containing shell having one or more voids defined therein containing a material, such as air, serving as a refractive element, having a lower index of refraction than the liquid.

Briefly, in accordance with a preferred embodiment of the invention, there is provided a shell having an input window and an output window. The shell is filled with a liquid optical fluid having an index of refraction greater than one. Lenses are formed within the liquid optical fluid medium by placing containers containing a substance, such as air, having a lower refractive index than &that of the optical fluid into the optical fluid medium. The containers are preferably fabricated from a transparent material, such as acrylics, with a refractive index close to the liquid, so that the containers optically vanish when immersed in the liquid. The use of a liquid optical fluid as the enveloping medium provides excellent cooling properties when used in high temperature environments, such as those associated with most projection systems, and specifically if the image source can be immersed within the fluid.

BRIEF DESCRIPTION OF THE DRAWING

These and other objects and advantages of the present invention will become readily apparent upon consideration of the following detailed description and attached drawing, wherein:

FIG. 1 shows an optical fluid-filled vessel having voids therein that serve as lenses;

FIG. 2 shows a lens system similar to that of FIG. 1 wherein the fluid-filled vessel is partitioned and contains fluids of different indices of refraction;

FIG. 3 illustrates a lens system according to the invention used in conjunction with a multiple cathode ray tube projection system;

FIG. 4 illustrates the lens system according to the present invention used in conjunction with a multiple liquid crystal display projection system; and FIG. 5 illustrates the use of the lens system according to the present invention as projection optics in a projection television system.

DETAILED DESCRIPTION OF THE PREFERRED EMBODIMENT

Referring now to the drawing, with particular attention to FIG. 1, there is shown a lens system according to the invention that is suitable for various purposes, such as for use in cameras or projectors. The lens system illustrated in FIG. 1 comprises an outer shell 10 containing an optical fluid 12 and having a pair of input and output windows 14 and 16, respectively. The liquid within the shell may be an optical oil or immersion fluid of the type used in immersed optics. Such immersion fluids are available in various indices of refraction, and the index of refraction of the fluid is preferably selected to be approximately the same as an acrylic plastic.

Disposed within the fluid 12 is a plurality of refractive elements 18 that have an index of refraction that is lower than the index of refraction of the fluid medium 12 and serve as the lens element of the lens system. The refractive elements 18 may preferably take the form of vacuum or gas-filled chambers that may be filled with air. The chambers are defined by walls 20 that are preferably made of acrylics. The refractive elements 18 are supported within the fluid 12 by supporting members 22 that support the air-containing refractive elements 18 within the fluid 12. Apertures are formed in the supporting members 22 to permit fluid to flow throughout the shell 10 so that temperature and pressure differences may be equalized.

In the embodiment illustrated in FIG. 1, the refracting elements 18 are contained within a fluid medium having a constant index of refraction. However, in certain instances, it may be desirable to utilize optical fluids having different indices of refraction between different ones of the lens elements to obtain certain optical characteristics. Such an embodiment is illustrated in FIG. 2 wherein a shell 10' having input and output windows 14' and 16', respectively, has a plurality of refracting elements 18' contained therein. However, rather than having a homogeneous fluid surrounding all of the refracting elements 18', fluids having different indices of refraction are disposed between the elements 18'. For example, fluids 24, 26, 28, 30, 32 and 34 having different indices of refraction may be utilized between the various ones of the elements 18' and the input and output windows 14' and 16'. To prevent the intermixing of the fluids, a plurality of impermeable supporting members 22' are utilized to support the refracting elements 18'.

One of the advantages of utilizing the lens system according to the invention is that because of its good thermal properties, it is suitable for use in high temperature embodiments, and particularly useful for cooling high temperature light sources, such as cathode ray tubes, liquid crystal displays, laser sources, and incandescent and gas discharge sources.

A typical use for the lens system according to the invention is illustrated in FIG. 3 which illustrates the lens system according to the invention in conjunction with three cathode ray tubes of a projection television. The system illustrated in FIG. 3 utilizes a shell 40 containing a fluid 42 that is utilized as the enveloping medium. Three cathode ray tubes 44, 46 and 48 have their respective faceplates 50, 52 and 54 immersed in the fluid medium 42. The immersion is accomplished by providing openings in the shell 40 to receive the faceplates 50, 52 and 54, and hermetically sealing each of the faceplates 50, 52 and 54 to the shell 40. A dichroic combiner containing dichroic mirrors 56 and 58 is contained within the fluid medium 42. Preferably, the dichroic mirrors 56 and 58 are coated on low index glass and, as in conventional dichroic mirrors, their function is to reflect light of a predetermined color and to pass light having colors other than the predetermined color. For example, in a projection television system, if the colors projected by the three cathode ray tubes 44, 46 and 48 were blue, green and red, respectively, the dichroic mirror 56 would be selected to be a blue dichroic mirror that reflects light from the blue cathode ray tube 44 and passes light from the green and red cathode ray tubes 46 and 48. The dichroic mirror 58 would be a red dichroic mirror that reflects light from the red cathode ray tube 48 and passes light from the blue and green cathode ray tubes 44 and 46. Thus, the dichroic mirrors 56 and 58 would serve to combine the images from the three cathode ray tubes 44, 46 and 48 and pass it to a suitable projection lens system (not shown). A mirrored surface 60 reflects light from the face 50 of the cathode ray tube 44 into the dichroic mirror assembly through a refracting element 62 which may be similar to the refractive elements 18 and 18′ illustrated in FIGS. 1 and 2, respectively. The refracting element 62 is used because the optical distance from the faceplate 50 of the cathode ray tube 44 to the dichroic mirror assembly is greater than the distances from the faceplates 52 and 54 of the cathode ray tubes 46 and 48 to the dichroic mirror assembly, and serves to compensate for changes in the size of the image received at the dichroic mirror assembly due to the difference in distance.

FIG. 4 shows a lens system according to the invention utilized in a projection television of the type that utilizes liquid crystal displays as the image forming elements. In the embodiment illustrated in FIG. 4, a shell 70 is filled with an optical fluid 72 and utilizes a pair of dichroic mirrors 74 and 76 to combine the images from three liquid crystal displays 78, 80 and 82 that are illuminated by three light sources 84, 86 and 88, which may be blue, green and red light sources, respectively. The liquid crystal displays 78, 80 and 82 may be sealed within openings within the container 70 and optically immersed within the fluid medium 72. Refracting elements 90, 92 and 94, which may be air-filled refracting elements, such as those shown in FIGS. 1 and 2, serve to reduce the size of the image received from the liquid crystal displays 78, 80 and 82, to thereby reduce the size of the dichroic mirrors and the projection optics. The combined image from the dichroic mirrors 74 and 76 is output through an output window containing another refractive member 96 to a conventional projection lens system 98. Although FIG. 4 shows the air-filled lens element 96 as the output window, the air-filled lens element 96 could be replaced by a simple plano, concave or convex output window with proper modifications to the projection lens system 98.

The lens system according to the present invention can also be utilized for the projection optics of a projection television system. As is illustrated in FIG. 5, a container 100 having a pair of dichroic mirrors 102 and 104 contained therein may be utilized to combine images from three cathode ray tubes 106, 108 and 110. The combined image may then be focused by a plurality of refracting elements 112, 114, 116 and 118 contained within the container 100 and surrounded by an immersion fluid 120. To permit focusing of the lens system, a forward portion 122 of the housing 100 is slidably retained within a fluid impermeable collar 124 which permits the forward portion 122 of the housing 100 containing the elements 112, 114 and 116 to be slidably moved within the collar 124 permitting the optical system to be focused. Inasmuch as moving the forward portion 122 of the housing changes the interior volume of the shell 100, a reservoir 126 is provided to supply additional optical fluid to the housing 100. For example, when the forward portion 122 is moved to the left, additional fluid from the reservoir 126 is required and, likewise, excess fluid is received by the reservoir 126 when the volume of the housing 100 is reduced by moving the forward portion 122 to the right. Alternatively, the various lens elements could be moved within the housing 100 without changing the volume of the housing 100, thereby eliminating the need for the reservoir 126.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A lens system comprising a hollow shell; an enveloping medium having an index of refraction greater than one, said hollow shell having a window disposed at one end thereof; at least one refracting element having an index of refraction lower than that of the enveloping medium contained in said hollow shell; and a transparent chamber having substantially the same index of refraction as said enveloping medium.

2. A lens system as recited in claim 1 wherein said enveloping medium includes a liquid.

3. A lens system as recited in claim 1 wherein said refracting element includes a gas.

4. A lens system as recited in claim 3 wherein said gas is air.

5. A lens system comprising:
   a hollow shell having at least one transparent window;
   a liquid medium having an index of refraction greater than one contained within said hollow shell; and
   means contained within said hollow shell for defining a void within said liquid medium, said void having an index of refraction that is lower than that of the liquid medium and serves as a refractive member within said liquid medium.

6. A lens system as recited in claim 5 wherein said void is filled with air.

7. A lens system as recited in claim 6 wherein said void is defined by a transparent chamber immersed in said liquid medium.

8. A lens system as recited in claim 7 wherein said transparent chamber is formed from a material having substantially the same index of refraction as the refractive index of said liquid medium.

9. A projection lens system comprising:
a hollow shell;
a liquid medium having an index of refraction greater than one contained within said hollow shell; and
means contained within said hollow shell for defining a void within said liquid medium, said void having an index of refraction that is lower than that of the liquid medium and serves as a refractive member within said liquid medium; and
a source of images to be projected optically immersed in said liquid medium.

10. A projection lens system as recited in claim 9 wherein said void is filled with air.

11. A projection lens system as recited in claim 10 wherein said void is defined by a transparent chamber immersed in said liquid medium.

12. A projection lens system as recited in claim 11 wherein said transparent chamber is formed from a material having substantially the same index of refraction as the refractive index of said liquid medium.

13. A projection lens system as recited in claim 9 wherein said image source includes a cathode ray tube.

14. A projection lens system as recited in claim 9 wherein said image source includes a liquid crystal display.

15. A lens system for a projection television system comprising:
a hollow shell having at least one transparent window;
a liquid medium having an index of refraction greater than one contained within said hollow shell;
a pair of dichroic mirrors contained within said hollow shell;
means contained within said hollow shell for defining a void within said liquid medium, said void having an index of refraction that is lower than that of the liquid medium and serves as a refractive member within said liquid medium; and
a substrate forming images to be projected optically immersed in said liquid medium.

16. A projection lens system according to claim 15 wherein said hollow shell is selectively extensible and retractable, said hollow shell further includes a collar connected thereto for movement between a first and second position.

17. A projection lens system as recited in claim 15 wherein said hollow shell includes a reservoir for containing excess liquid medium.

18. A projection lens system as recited in claim 15 wherein said void is filled with air.

19. A projection lens system as recited in claim 18 wherein said void is defined by a transparent chamber immersed in said liquid medium.

20. A projection lens system as recited in claim 19 wherein said transparent chamber is formed from a material having substantially the same index of refraction as the refractive index of said liquid medium.

21. A projection lens system as recited in claim 20 wherein said image source includes a cathode ray tube.

22. A projection lens system as recited in claim 21 wherein said image source includes a liquid crystal display.

* * * * *